United States Patent [19]

Margraf

[11] Patent Number: 4,496,377
[45] Date of Patent: Jan. 29, 1985

[54] BAG FILTER APPARATUS

[76] Inventor: Adolf Margraf, Am Schleplingsbach 46, 3060 Stadthagen, Fed. Rep. of Germany

[21] Appl. No.: 473,003

[22] Filed: Mar. 7, 1983

[30] Foreign Application Priority Data

Mar. 11, 1982 [DE] Fed. Rep. of Germany ... 8206750[U]

[51] Int. Cl.³ .............................................. B01D 46/04
[52] U.S. Cl. ......................................... 55/287; 55/291; 55/294; 55/304; 55/379
[58] Field of Search ................. 55/287, 294, 300, 304, 55/305, 341 HM, 378, 379, 291

[56] References Cited

U.S. PATENT DOCUMENTS

| 1,012,122 | 12/1911 | Budil | 55/341 HM |
| 1,316,924 | 9/1919 | Ross | 55/287 |
| 2,137,254 | 11/1938 | Turnbull | 55/304 |
| 2,519,082 | 8/1950 | Stevenson | 55/304 |
| 2,722,995 | 11/1955 | King | 55/304 |
| 4,157,900 | 6/1979 | Margraf | 55/379 |
| 4,164,400 | 8/1979 | Wald | 55/291 |
| 4,283,208 | 8/1981 | Fernando | 55/304 |

FOREIGN PATENT DOCUMENTS

| 2106114 | 8/1971 | Fed. Rep. of Germany | 55/291 |
| 2634022 | 2/1978 | Fed. Rep. of Germany | 55/291 |
| 3003882 | 8/1981 | Fed. Rep. of Germany | 55/294 |
| 3045524 | 6/1982 | Fed. Rep. of Germany | 55/379 |

Primary Examiner—David L. Lacey
Attorney, Agent, or Firm—Balogh, Osann, Kramer, Dvorak, Genova & Traub

[57] ABSTRACT

The present invention relates to a single-chamber or multichamber bag filter apparatus including horizontal and cross-sectionally flatly oval filter bags, each of which being provided with a rigid internal spacing element terminating at a distance before a perforated wall separating the dust gas side from the pure gas side and being loosely supported thereat. The filter bags including the spacing elements are releasably connected at their closed extremity to supports of an auxiliary wall springily mounted in front of the rear wall of the housing, and this auxiliary wall is coupled to an oscillation generator.

3 Claims, 5 Drawing Figures

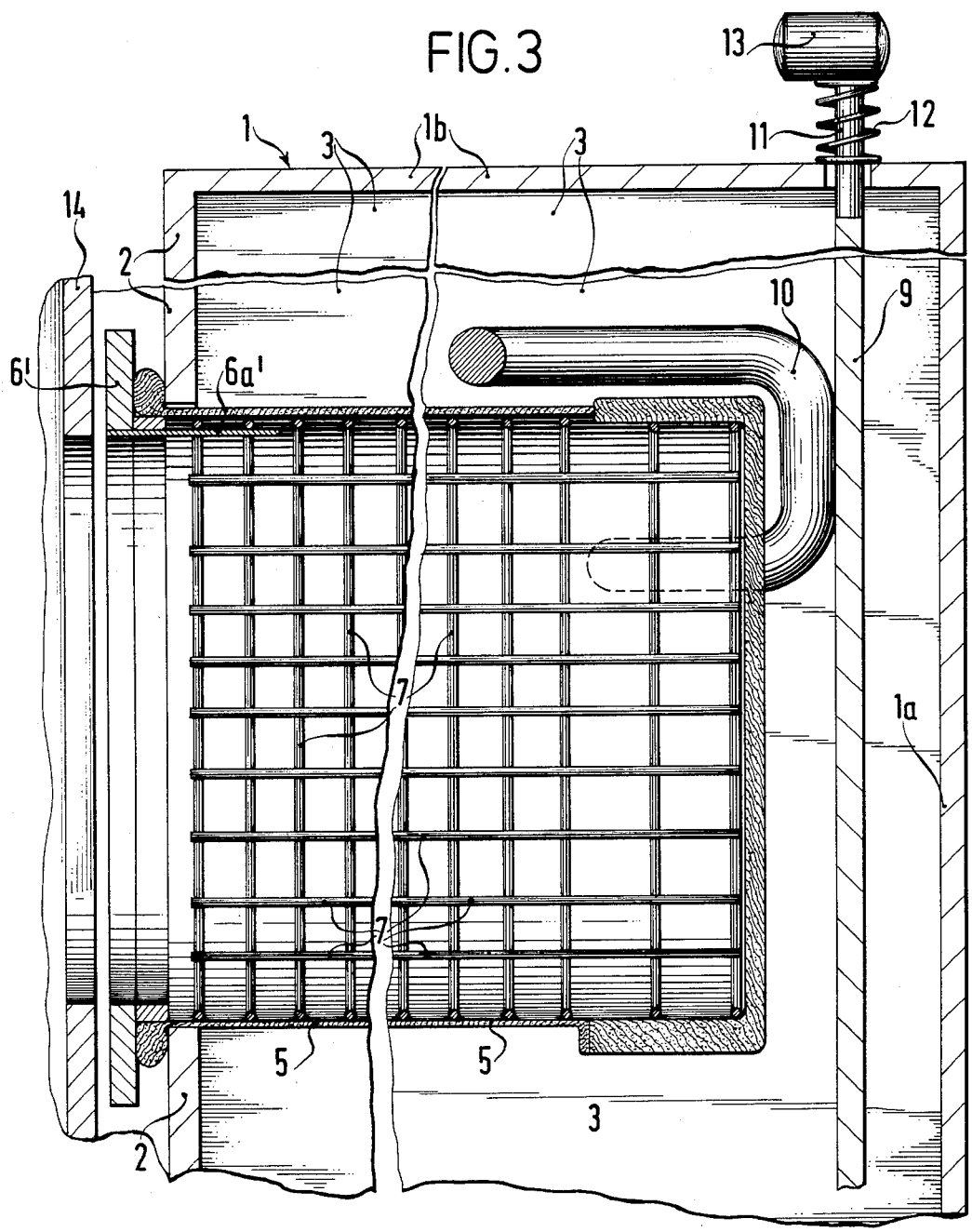

BAG FILTER APPARATUS

BACKGROUND OF THE INVENTION

This invention relates to a bag filter apparatus including a housing having at least one filter chamber, which is subdivided by means of a partition provided with perforations into a clean gas space and a dust gas space, the dust gas space receiving vertical and parallel rows of horizontal, cross-sectionally flatly oval filter bags impinged upon by dust gas from the outside towards the inside and each provided with a rigid internal spacing element, said bags being supported in the dust gas space at the closed extremity, and have their open extremity releasably fastened to the partition in sealed manner in alignment with the perforation of the partition by means of a frame. Hereinafter, such filters will be referred to as "of the kind described".

In bag filters of the kind described, the internal spacing elements are firmly clamped at the partition provided with perforations and at the free closed extremity, at the rear side of the housing, so that a shaking action intended to clean off the filter bag surfaces was applicable only with difficulty, apart from the fact that the firm clamping of the extremities of the bags and of the spacing elements could result in fracturing the spacing elements at both clamped extremities by such shaking action or vibration.

It is an object of the invention to obtain great durability of the filter bags without them wearing away, while allowing the surfaces of the filter bags to be cleaned off by mechanical action with little power demand and low costs, and using a bag filter of the kind described, with or without a counterflow scavenging action.

SUMMARY OF THE INVENTION

This and other objects are achieved in accordance with the invention, a bag filter of the kind described, by arranging that the spacing element of each filter bag terminates before the partition and is loosely supported thereat by parts of the sealing frame, and that all the filter bags are connected at the free or closed extremity to at least one vertically spring-borne auxiliary wall extending freely and parallel before the rear wall of the housing and spring-supported vertically, said wall being coupled to an oscillation generator which is intermittently operable.

Due to this arrangement, the flattened oval filter bags may be exposed to a cleansing action by mechanical operation, because the filter bags are henceforth placed in oscillation throughout their surface, since the vibration or oscillatory displacement of the auxiliary wall are transmitted to the rigid spacing elements in the bags and also place these in oscillatory motion which is transferred to the filter bag material. The dust settling on the filter surfaces during the dedusting operation is freed by these oscillations and drops downwards in the housing into a dust collection space. The aforesaid vibratory operation has been rendered possible due to the fact that the rigid spacing elements of the filter bags terminate before the partition and are merely supported loosely thereat, for example on parts of the sealing frame of the corresponding bag aperture rim. Any rigid connection to the partition wall is thereby prevented or minimized.

BRIEF DESCRIPTION OF THE DRAWINGS

In order that the invention may be more clearly understood, reference will now be made to the accompanying drawings which diagrammatically illustrate one embodiment thereof by way of example and in which:

FIG. 3 shows the part of FIG. 1 shown boxed in at X by interrupted lines,

DETAILED DESCRIPTION OF THE PREFERRED EMBODIMENT

Figure 1:
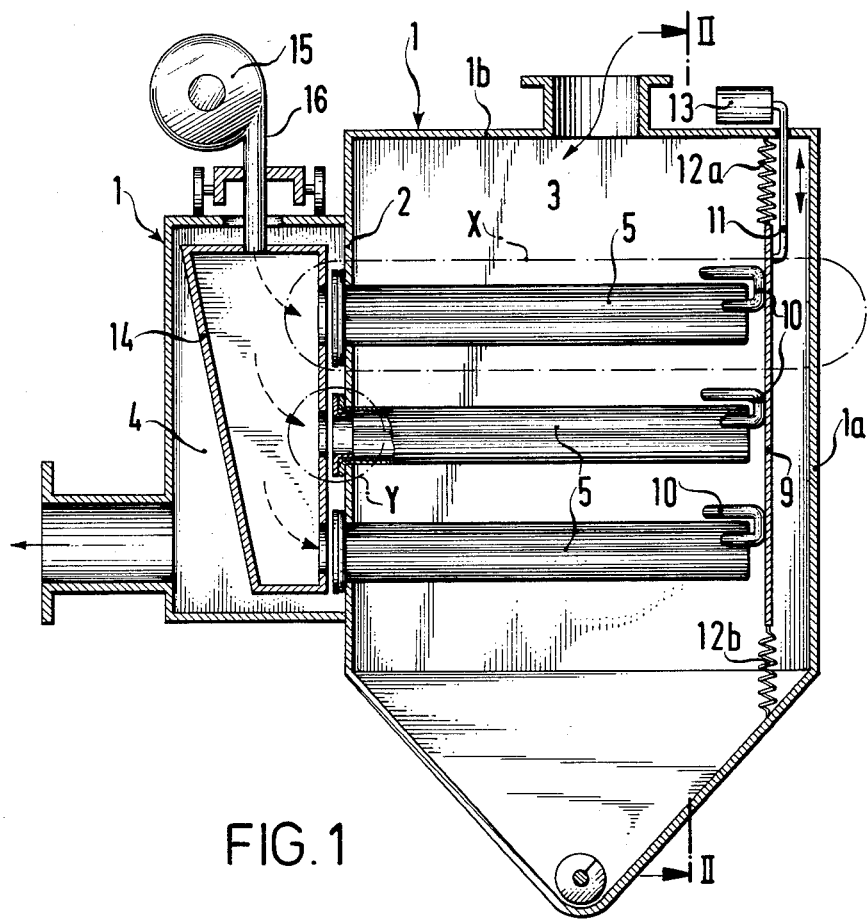
FIG. 1 shows a cross-section through a multichamber bag filter.
Figure 4:
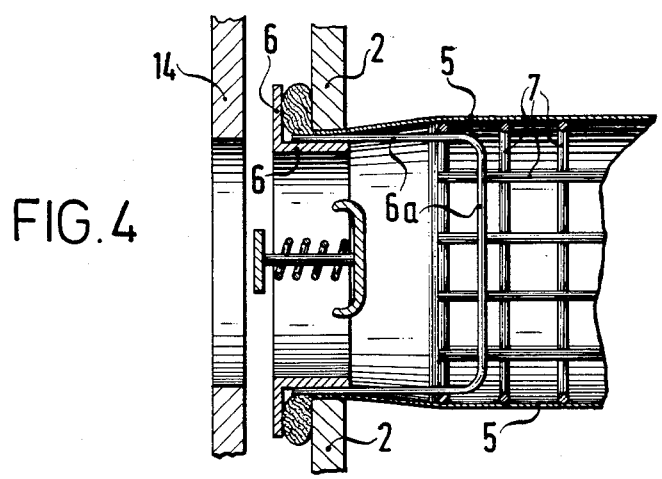
FIG. 4 shows the encircled part Y of FIG. 1 to an enlarged scale.
Figure 2:
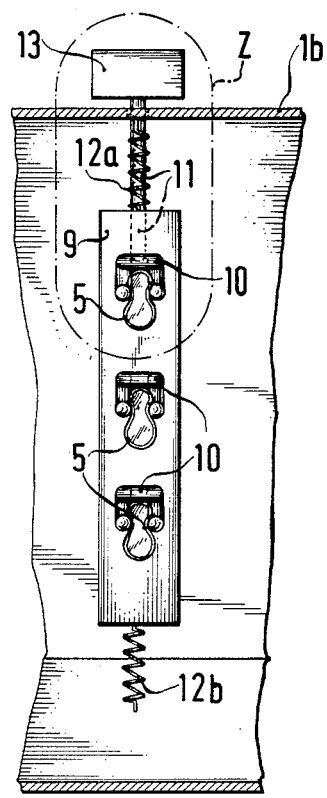
FIG. 2 shows a partial section along line II—II of FIG. 1.
Figure 5:
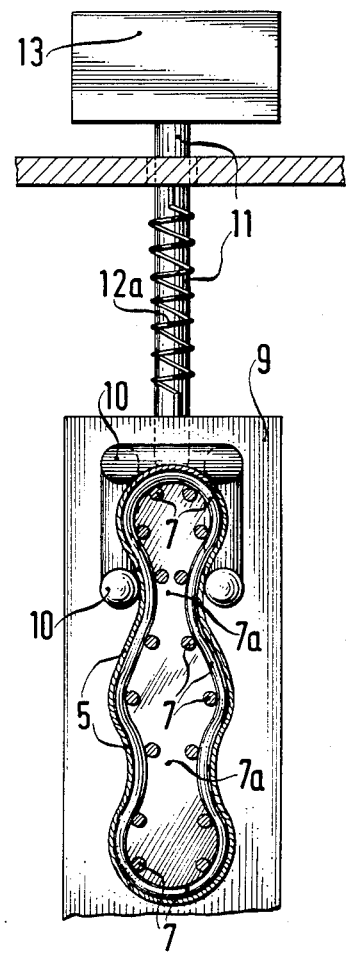
FIG. 5 shows the encircled part Z in FIG. 2 to an enlarged scale.

Referring now to the drawings there is shown a bag filter apparatus which as is conventional, includes a housing 1 the chamber or chambers of which is or are subdivided by a perforated vertical partition 2 into dedusting chambers 3 supplied with dust gas and including a lower dust collection funnel, and purified gas spaces 4. The filter bags of flat oval cross-section 5 are installed horizontally in parallel and vertical rows in the dedusting chamber or chambers 3, in such manner that the open bag extremities are placed in coincidence with the partition holes by means of a clamping frame 6. The filter bags 5 are supported by rigid internal and for example basket-like spacing elements 7 which within the dedusting chambers 3 terminate a short distance before the partition 2 and are loosely supported thereat by parts 6a of the clamping frame 6.

The filter bags 5 are impinged upon by dust gas from the outside towards the inside, so that the dust is held back externally on the filter bags.

In order to promote the mechanical cleansing action of the invention, the dedusting chamber may be isolated intermittently from dust gas feed and impingement (in desirable instances), and acted upon by scavenging air in counterflow to the dust gas, the scavenging air flowing through the filter bags from the inside to the outside thereof.

The scavenging air flow is supplied via a scavenging air chamber 14 and a scavenging air duct 16 connected to a scavenging fan 15.

To establish their horizontal position, the filter bags 5 should be supported at the closed extremity pointing away from the partition 2 and in accordance with the inventive object are to be placed in vibratory or shaking motion by mechanical means.

To this end, an auxiliary wall 9 to which the closed extremities of the filter bags may be connected releasably, is provided in the dust gas space 3 at a short distance parallel to and before the rear wall 1a of the housing of each chamber. This connection is established for example by means of bifurcated holders 10 which for example externally firmly enclamp one of the two constrictions 7a of the spacing elements 7, after these constrictions have been inserted together with the bag 5 into the corresponding bifurcated holder 10.

Other releasable connections of the spacing elements 7 to the auxiliary wall 9 at the closed extremities of the filter bags may be possible. Such connections, however, should be based on special considerations that the auxiliary wall 9 may be placed in oscillation. Also, the auxiliary wall 9 may be replaced by an appropriate frame.

At the upper extremity, the auxiliary wall 9 is provided with a linkage 11 freely traversing the top of the housing, and is suspended in sprung manner by means of an upper spring 12a (FIG. 1), or a spring support 12b may be provided at the lower extremity of the auxiliary wall. The auxiliary wall 9 may however also be supported on the cover 1b of the housing 1 by means of a compression spring 12 (FIG. 3).

The linkage 11 of the auxiliary wall 9 has connected to it a vibrator or oscillator 13, e.g. a magnetic vibrator, an unbalanced motor, a crank drive or the like, which during the intermittent cleansing of the filter bags 5 places the auxiliary wall 9 and the spacing elements 7 connected thereto and thereby also the filter bags 5 in oscillation, so that an oscillatory system is obtained which has no rigid coupling to the partition 2 since the spacing elements 7 are loosely supported thereat. The flattened oval horizontal filter bags thus cannot incur any substantial attrition on the partition by their more or less elastic material, and the operation with an oscillatory, shaking or analogous action without damaging the filter bags and if appropriate also in conjunction with a counterflow scavenging action, did not become possible until this loose form of support.

If a counterflow cleansing operation is required complementarily, the corresponding pure gas space 4 should be shut off from the pure gas take-up pipe and connected to the scavenging fan 15 or a source of compressed air, apart from isolating one of the chambers from dust gas impingement.

I claim:

1. In a bag filter apparatus comprising, a housing having at least one filter chamber which is sub-divided into a clean gas room having a clean gas outlet, and a dust gas room having a dust gas inlet, by a partition wall provided with perforations, a plurality of horizontal and cross-sectionally flattened oval filter bags arranged in vertical and parallel rows, and received in the dust gas room between a rear wall of the housing and the partition wall, to be impinged upon by dust gas from the outside toward the inside thereof, each of said filter bags being provided with a rigid internal spacing element, and being supported at the closed extremity thereof in the dust gas room, and having the open extremity thereof releasably fastened to the partition wall, and a sealing frame having rigid parts disposed at the clear gas side of the partition wall releasably and sealingly fastening the open extremities of said filter bags to the partition wall in alignment with the perforations of the partition wall, the improvement which comprises the spacing element of each of said filter bags terminates before the partition wall, and is loosely supported thereat by the rigid parts of said sealing frame, at least one vertical spring-borne auxiliary wall extending freely and parallel to the rear wall of the housing for supporting said filter bags at the closed extremity thereof, and an intermittently operable oscillation generator coupled to said at least one auxiliary wall for oscillating the same, said filter bags being releasably connected at the closed extremity thereof to said at least one auxiliary wall.

2. The bag filter apparatus according to claim 1 wherein each of the spacing elements of said filter bags is provided at least with one longitudinally extending constriction, and said at least one auxiliary wall supports the closed extremity of each of said filter bags at said at least one longitudinally extending constriction of the spacing elements.

3. The bag filter apparatus according to claim 1, further including a scavenging fan in flow communication with a scavenging chamber, said scavenging chamber being positioned so as to provided a scavenging air flow through said filter bags from the inside to the outside thereof.

* * * * *